US011018847B2

(12) United States Patent
Hunacek et al.

(10) Patent No.: US 11,018,847 B2
(45) Date of Patent: *May 25, 2021

(54) DEVICE KEYS PROTECTION

(71) Applicant: NAGRAVISION S.A., Cheseaux-sur-Lausanne (CH)

(72) Inventors: Didier Hunacek, Blonay (CH); Marco Macchetti, Casnate con Bernate (IT); Nicolas Fischer, Versoix (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 25 days.

This patent is subject to a terminal disclaimer.

(21) Appl. No.: 16/238,301

(22) Filed: Jan. 2, 2019

(65) Prior Publication Data

US 2019/0280853 A1 Sep. 12, 2019

Related U.S. Application Data

(63) Continuation of application No. 15/535,334, filed as application No. PCT/EP2015/078896 on Dec. 8, 2015, now Pat. No. 10,205,588.

(30) Foreign Application Priority Data

Dec. 12, 2014 (EP) .................................... 14197711

(51) Int. Cl.
*H04L 9/32* (2006.01)
*H04L 9/00* (2006.01)
(Continued)

(52) U.S. Cl.
CPC ............ *H04L 9/003* (2013.01); *G06F 21/445* (2013.01); *H04L 9/002* (2013.01); *H04L 9/006* (2013.01);
(Continued)

(58) Field of Classification Search
CPC ... H04L 9/0897; H04L 9/3234; H04L 9/3247; H04L 9/0825; H04L 63/0442; H04L 9/006; H04L 9/08
See application file for complete search history.

(56) References Cited

U.S. PATENT DOCUMENTS 8,423,789 B1\* 4/2013 Poo ........................ G06F 21/602
380/44
2007/0095927 A1\* 5/2007 Pesonen .................. G06F 21/73
235/492

(Continued)

FOREIGN PATENT DOCUMENTS

CN 101951315 A 1/2011
CN 103518348 A 1/2014
(Continued)

OTHER PUBLICATIONS

International Search Report issued in International Application No. PCT/EP2015/078896 dated Feb. 3, 2016.
(Continued)

*Primary Examiner* — Ali S Abyaneh
(74) *Attorney, Agent, or Firm* — Oblon, McClelland, Maier & Neustadt, L.L.P.

(57) ABSTRACT

A method to protect a device key in a device comprising at least one secure element locally connected to at least one time programmable memory storing a global value in form of a bit string comprising locked bits and unlocked bits. The locked bits are irreversibly pre-programmed in the one-time-programmable memory during an initialization phase of the device while the un-locked bits remaining in an initial state may be programmable by the secure element. The secure element is configured to generate, at initialization of the device, a device specific value by using the global value, program the device specific value previously obtained in the one time programmable memory, and erase the global value
(Continued)

by programming the unlocked bits of the corresponding bit string. A further object of the disclosure includes a device configured to carry out the method.

15 Claims, 4 Drawing Sheets

(51) Int. Cl.
*G06F 21/44* (2013.01)
*H04L 9/06* (2006.01)
*H04L 9/08* (2006.01)
*H04L 29/06* (2006.01)

(52) U.S. Cl.
CPC .......... *H04L 9/0662* (2013.01); *H04L 9/0897* (2013.01); *H04L 9/3234* (2013.01); *H04L 9/3247* (2013.01); *H04L 63/0435* (2013.01); *H04L 63/0442* (2013.01); *H04L 63/061* (2013.01); *H04L 2209/56* (2013.01)

(56) References Cited

U.S. PATENT DOCUMENTS

| | | | |
|---|---|---|---|
| 2008/0114984 A1 | 5/2008 | Srinivasan et al. | |
| 2009/0202069 A1* | 8/2009 | Cox | G06F 21/10 380/44 |
| 2010/0091988 A1 | 4/2010 | Srinivasan et al. | |
| 2010/0095125 A1 | 4/2010 | Srinivasan et al. | |
| 2010/0095134 A1 | 4/2010 | Srinivasan et al. | |
| 2010/0166182 A1 | 7/2010 | Berggren et al. | |
| 2011/0224509 A1 | 9/2011 | Fish et al. | |
| 2011/0225409 A1* | 9/2011 | Sibert | G06F 21/575 713/2 |
| 2014/0016776 A1 | 1/2014 | Van Foreest et al. | |
| 2014/0325240 A1 | 10/2014 | Srinivasan et al. | |
| 2015/0365231 A1* | 12/2015 | Warnez | H04W 12/0401 380/44 |

FOREIGN PATENT DOCUMENTS

| | | |
|---|---|---|
| CN | 103562922 A | 2/2014 |
| CN | 103931221 A | 7/2014 |
| CN | 103988464 A | 8/2014 |
| EP | 2 506 176 | 3/2012 |
| WO | WO 2008/057156 | 5/2008 |
| WO | WO 2010/042560 A2 | 4/2010 |

OTHER PUBLICATIONS

Written Opinion Issued in International Application No. PCT/EP2015/078896 dated Feb. 3, 2016.
Indian Office Action dated Jul. 2, 2020 in Indian Patent Application No. 201747020242, citing document AO therein, 7 pages.
Brazilian Office Action published on Jun. 2, 2020, in Patent Application No. BR112017011624-3, citing documents AO-AS therein, 7 pages (with English translation).

* cited by examiner

DEVICE KEYS PROTECTION

CROSS REFERENCE TO RELATED APPLICATIONS

This application is a continuation of U.S. application Ser. No. 15/535,334, filed Jun. 12, 2017, now issued as U.S. Pat. No. 10,205,588, which is a the national stage of PCT/EP2015/078896, filed Dec. 8, 2015, which claims priority from European Patent Application No. 14197711.6, filed on Dec. 12, 2014; the entire contents of each of which are incorporated herein by reference.

FIELD OF THE INVENTION

The present invention relates to the field of digital data transmission between trusted devices and data processing entities outside of the trusted environment using data authentication.

TECHNICAL BACKGROUND

A trusted device relates to a secure device incorporated in a personal computer, mobile equipment, or any other data processing entity to provide built-in security mechanisms that place minimal dependency on a user or administrator to keep the entity and its peripheral devices secure. Trusted personal computing devices have been developed for maximizing security of individual computers through hardware and operating system-based mechanisms rather than through add-in programs and policies. To that end, security mechanisms may be implemented into chips, chipsets, systems on chip and motherboards, among other modules; because it is well known by a person skilled in the art that hardware-based mechanisms are inherently more trustworthy than those created with software.

In order to assure authenticity of data transmitted by a trusted device, digital signatures may be applied to the data. Therefore the trusted device needs access to a key pair including a private key and a public key. In fact, if several trusted devices send data to a same entity and to avoid having several public keys to authenticate the data, the key pair on the trusted devices should be global. From a security point of view, if the private key is compromised on one device, the whole system is broken because a hacker could therefore forge his own authentic data. This creates a single point of failure which is catastrophic in a security system.

The hacker can use several types of non-invasive or invasive attacks to retrieve the global private key such as for example: software attacks, opening the device to try to read the key directly inside the device, Differential Power Analysis (DPA) or Simple power analysis (SPA) attacks, fault injection attacks, etc.

A secure device may be attacked in several ways for recovering the global private key. Some attacks are known as non-invasive attacks since they aim to observe the power consumption, the electromagnetic emanation or the processing time of the device. Other attacks are referenced as invasive attacks, since they involve modifying the device, in particular its behavior during a short lapse of time. In this last category, one knows the Differential Fault Analysis (DFA) as being a serious threat against any encryption/decryption system. DFA is based on the observation and the comparison of the outputs provided by a cryptographic device under two different states. One of these states corresponds to the normal operation of the device, whereas the other is obtained by voluntarily injecting a fault aiming to alter one or several bits by switching from 0 to 1 or vice versa. Such a physical bit inversion can be carried out for example by sweeping the surface of an integrated circuit with a laser beam. By locating sensitive areas within the cryptographic device, laser shots allow disrupting the behavior of the device in an accurate and easy manner, since they can be implemented under the control of a computer, while acting with a very good spatial and temporal resolution. When several faults are injected during the processing of a cryptographic algorithm, the analysis of erroneous outputs allow determining the global private by observing fault propagations within the algorithm.

Different techniques for protecting integrity of programs, cryptographic keys or parameters used to produce the same are used in the prior art as for example:

Document US2011/225409A1 discloses a chipset comprising a one-time-programmable (OTP) memory storing a software boot identification (CCID), wherein the CCID comprises a multi-bit value having two or more CCID customer identifications (CIDs) contained at customer-specific index positions within the multi-bit value. The chipset further comprises one or more processing circuits configured to obtain a certificate and a certificate index value from a customer certificate; read an OTP CID from the CCID by indexing into the CCID according to the certificate index value; determine whether the customer certificate has or has not been revoked based on evaluating the OTP CID with the certificate; and disallow software booting of the chipset, if the customer certificate is determined as having been revoked. The OTP CID values are programmed in OTP memory so that individual bits may be changed from 0 to 1, but not back to 0. In this case bit 1 are locked and bit 0 are unlocked. The OTP CID values for each customer may be managed by the chipset manufacturer.

Document EP2506176A1 discloses methods and systems related to producing chips with the uniqueness property. A random bit vector is generated using a hardware random number generator on the chip or "on the fly" as a hardware component is being produced. The generated random bit vector is stored in a one-time programmable memory of the chip. A value is derived in the chip from the random bit vector programmed in the one-time programmable memory of the chip. The derived value is exported to an external receiving module communicably connected to the chip to enable a security application provider to encrypt a message that can be decrypted by the chip using a key based on the random bit vector programmed in the one time programmable memory of the chip. The random bit vector is programmed in a PROM (Programmable Read-Only Memory) where all bits are locked so that the entire programmed bit string of the vector cannot be modified by a processor. The only way to modify values stored in a PROM is to replace physically the PROM by another one containing updated values.

Document US2010/166182A1 discloses a method for providing secure packetized voice transmissions. A public key corresponding to a destination device is retrieved. An input signal is digitized for transmission over a packetized voice connection to the destination device. The digitized signal is encrypted using a public key of the destination device. This encrypted input signal when received at the destination device is decrypted using a secure private key at the destination device. According to an embodiment, the call device may be associated with an analog terminal adapter provided with an USB connector for inserting a flash storage device, which can contain a private key of an asymmetrical public/private key pair and a pointer to where the public key is located. Then, during session initiation at the startup of the call, the encryptor/decryptor of the destination call device can retrieve the public key of the source call device, and utilize the public key to encrypt data being sent to the source call device. The private key may be stored in a fixed memory of the call device or in a removable flash memory where all bits of the private key bit string may be modified from 0 to 1 and inversely without any restriction.

Document WO2008/057156A2 discloses an improved secure programming technique involving reducing the size of bits programmed in on-chip secret non-volatile memory, at the same time enabling the typical secure applications supported by secure devices. A technique for secure programming involves decoupling chip manufacture from the later process of connecting to ticket servers to obtain tickets. A method according to the technique may involve sending a (manufacturing) server signed certificate from the device prior to any communication to receive tickets. A device according to the technique may include chip-internal non-volatile memory to store the certificate along with the private key, in the manufacturing process. The system comprises a secure processor, an operating system, ticket services, a calling application, and a protected memory. The operating system includes a security kernel, which in turn includes a key store, an encryption/decryption engine, and a security application.

Accordingly, there is a need to provide an efficient solution to prevent hackers determining a private key through any differential fault analysis, or more generally, to guess such a key through information extracted by any kind of analysis.

SUMMARY OF THE INVENTION

To overcome drawbacks of prior art systems and methods to protect cryptographic keys, it would be beneficial to practice a device and a method for securing in an efficient way cryptographic asymmetric key pairs while avoiding, among others, having to manage a plurality of key pairs for authenticating a plurality of devices.

An embodiment of the disclosure proposes a method to protect a device key in a device comprising at least one secure element locally connected to at least one one-time-programmable memory according to claim 1

A further embodiment proposes a device comprising at least one secure element locally connected o at least one one-time-programmable memory configured to store a global value according to claim 9.

A secure element of the device may comprise a key generator configured to generate a unique device specific value as for example an asymmetric key pair by using the global value stored in the one time programmable memory. This operation is carried out in general at initialization or boot of the device. The unique device key pair specific to the device comprises a device private key and device public key.

As the global value, the generated device key pair is preferably stored in the one time programmable memory. In a preferred embodiment, the global value represents a global key pair including a global private key and a global public key which are programmed in the one time programmable memory in an irreversible way in general at manufacturing of the device.

According to a further embodiment, the device public key is signed by the global private key and the global private key erased from the one time programmable memory by programming all or part of the unlocked bit so that the secure element recognizes the deletion of the global private key.

In order to improve security of the device, a preferred solution allows using the global private key only once, because using and keeping such a global private key is risky, because it may be exposed to tampering and reusing for communication with any other device According to a further embodiment, the global value stored in the one-time-programmable memory may be used by the secure element to protect the generated device specific key pair by blinding or encryption.

BRIEF DESCRIPTION OF THE DRAWINGS

The invention will be better understood with the following detailed description, which refers to the attached figures given as non-limiting examples.

DETAILED DESCRIPTION

Figure 1:
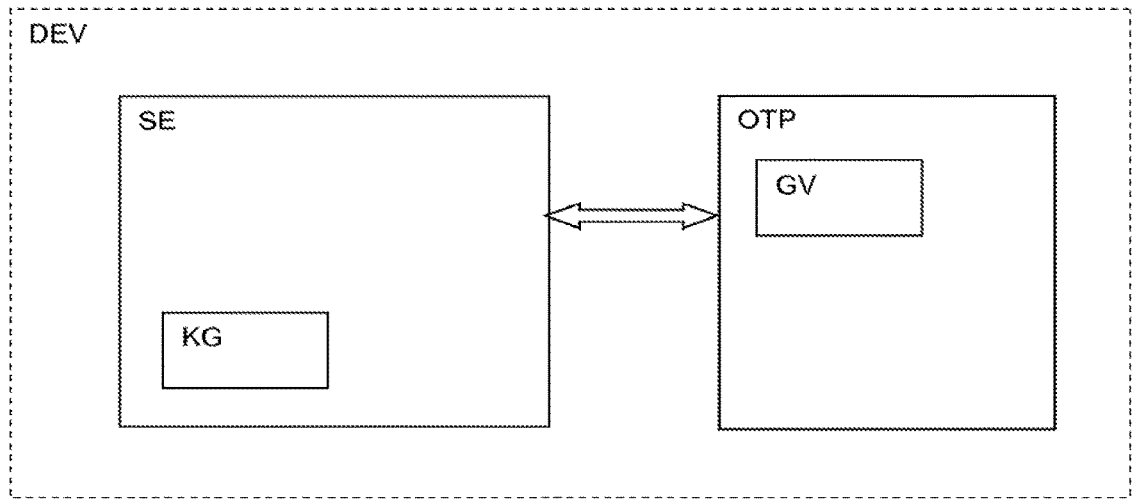
FIG. 1 shows an overview of the device of the invention comprising a secure element locally connected to a one time programmable memory.

The described device DEV comprises a secure element SE locally connected to a persistent memory or one time programmable memory OTP as schematically represented by FIG. 1. This memory OTP contains in general device specific parameters which are introduced at manufacturing or personalization or at first start of the device. The device specific parameters may comprise a global value GV used by the secure element SE to generate a device specific value DV including cryptographic keys.

The device DEV, also called a secure device, may be integrated in a personal computer, mobile equipment, pay television set top box, or any other data processing unit to provide built-in security mechanisms that are transparent for a user of the device. These security mechanisms generally hard-coded and combined with software programs may be installed into chips, chipsets, systems on chip, smartcards, motherboards, or other dedicated modules.

The secure element SE may include a platform onto which applications can be installed, personalized and managed. It consists of hardware, software, interfaces, and protocols that enable the secure storage of certificates and execution of applications for payment, authentication, and other services. Security-critical applications, such as those involving payment and account certificates, require secure hardware storage and a secure execution environment. On mobile devices, this is usually handled by the secure element.

A secure element SE may be implemented in different forms such as a Universal Integrated Circuit Card (UICC), an embedded secure element, or NFC (Near Field Communication) facilities such as a separate chip or secure device, which can be inserted into a slot on the mobile device or used in a contactless fashion. Typically a UICC is in the form of a subscriber identity module (SIM), which is controlled by the mobile network operators. An embedded secure element gives service providers the option to embed the secure element into the mobile phone itself. A secure element SE may include one or more security domains, each of which includes a collection of data, such as packages, applets, applications, and the like, that trust a common entity, that means that the security domains may be authenticated or managed by using a common or global cryptographic key or token. Security domains may be associated with service providers and may include service provider applets or applications such as loyalty, couponing, and credit card, and transit applications or applets.

According to an embodiment, the secure element SE comprises a key generator KG configured to generate a device specific value DV including an asymmetric device key pair by using the global value GV including a global asymmetric key pair stored in the one time programmable memory OTP. The generated asymmetric key pair is unique and specific to the device DEV and includes a device private key DKpri and a device public key DKpub which are stored into a non-volatile memory of the secure element SE.

Figure 2:
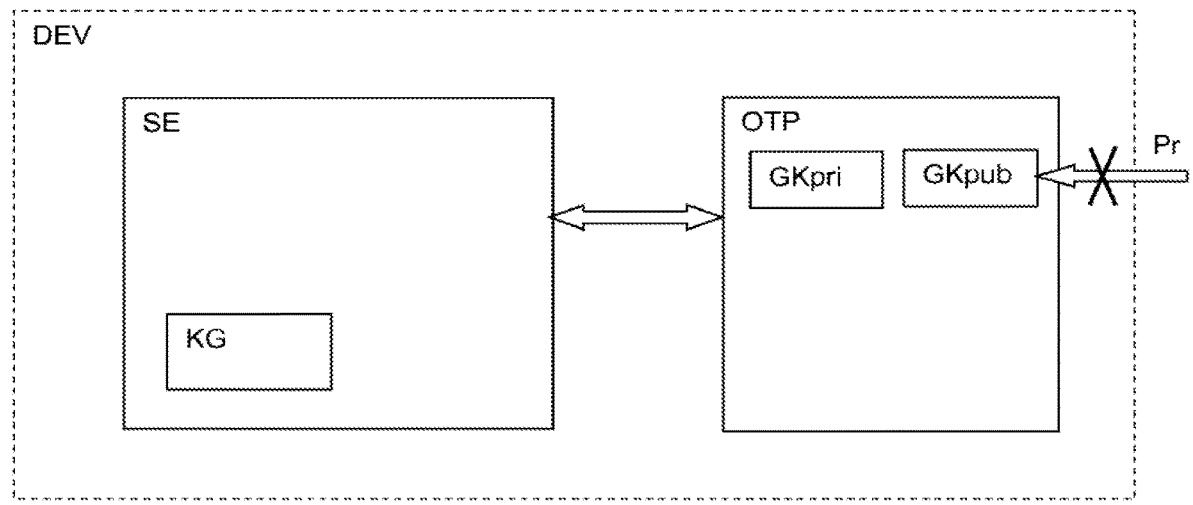
FIG. 2 shows an embodiment of the device where a global asymmetric key pair is written in the one time memory by using an external path different from the secure element.

FIG. 2 shows an example where the global asymmetric key pair including a global private key GKpri and a global public key GKpub are programmed in the one time programmable memory OTP through a particular path available only at manufacturing of the device DEV. This path in form of one or more data lines is preferably disabled by hardware means such as deactivating the path by blowing related fuses after programming the global asymmetric key pair in the one time programmable memory OTP.

When the data lines cannot be cut physically, the path may be permanently disabled by programming bits in the OTP memory so that an access to the OTP memory from outside is no more possible.

In an initialization phase, when the device DEV is manufactured or personalized, the global value GV in form of bit strings such as a key pair are programmed in the one time programmable memory OTP so that several bits are locked or blown in an irreversible way so that the concerned bits cannot be reset to the initial value, and the remaining bits of the string are left unlocked so that. these bits can be locked afterwards during operating of the device DEV. According to an example, all bits 1 may be locked while all bits 0 are unlocked or vice versa. The initial state of the OTP memory is either all bits set at 0 in the case a blown bit is set at 1 or inversely.

According to a particular configuration, blown bits may be set either at 0 or 1 in a same OTP memory depending on their memory address for example, the secure element SE being configured to recognize locked bits and unlocked bits which may be indicated with an appropriate index.

Figure 3:
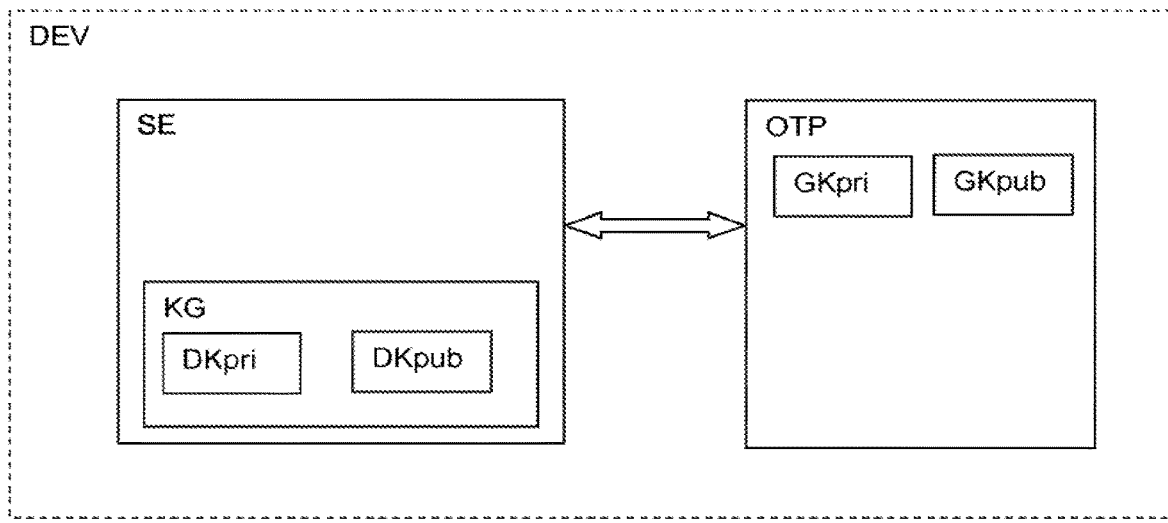
FIG. 3 shows an embodiment of the device where a random device key pair is generated by the secure element.

Beside manufacturing or personalization processing modules, the secure element SE is the only alternative module able to program the OTP memory bits. According to a further embodiment, at a first start, the secure element SE generates a random asymmetric device key pair by using a TRNG (True Random Number Generator) generator to provide uniqueness of the key pair. These keys are then signed by the secure element SE by using the global asymmetric key pair. In the examples illustrated by FIGS. 3 and 4, the device public key DKpub is signed preferably by the global private key GKpri. The global public key GKpub is thus used to verify the signature.

It has to be noted that the known signing algorithms use a private key to generate the signature, the public key being used to verify it.

The signature Sig DKpub may thus comprise a digest of the public device key DKpub signed by the global private key GKpri, the digest being calculated by applying a one-way and collision free hash function of type SHA-2, SHA-3, BLAKE or of any other proprietary type on the public device key DKpub.

Figure 5:
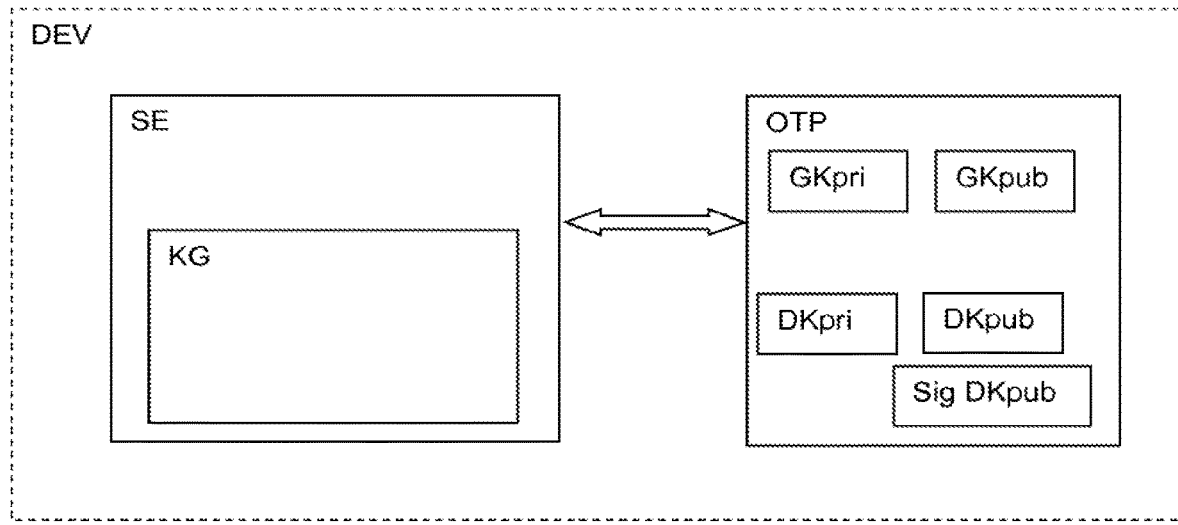
FIG. 5 shows an embodiment of the device where the device key pair and the signature of the device public key are written and locked in the one time programmable memory.

The generated device specific asymmetric key pair and the associated signature may be programmed in the OTP memory by a processor included in the secure element SE so that a plurality of bits of their values is locked to prevent any modification performed through an external intervention, see FIG. 5.

Figure 6:
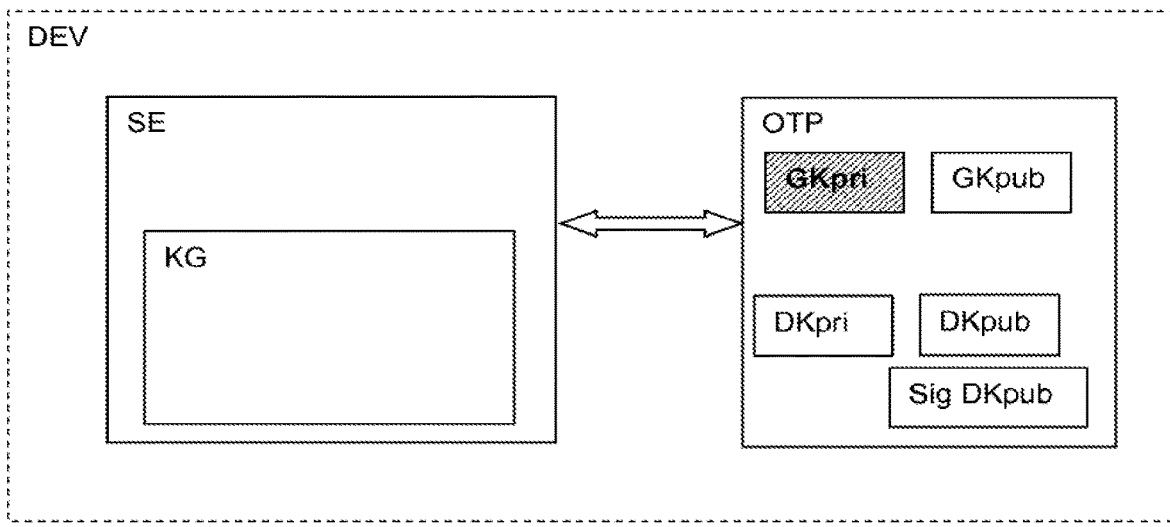
FIG. 6 shows an embodiment of the device where the secure element programs unlocked bit of the global private and/or public keys to erase them from the one time programmable memory.

In order to improve protection of the global keys, the global private key GKpri may be erased from the OTP memory by the processor of the secure element SE which programs all the unlocked bits of its value as illustrate by FIG. 6. In case the private global key GKpri was used to sign the device public key DKpub, a modification of the device key will result to an unsuccessful verification of its signature which cannot be reproduced due to the absence of the global private key GKpri.

According to a further embodiment, the processor of the secure element SE may erase the global public key GKpub or the entire global asymmetric key pair stored in the one time programmable memory OTP by programming the unlocked bits of the corresponding bit string.

In order to prevent global value GV or global key pair deletion by mistake, a trial mechanism may be implemented in the OTP memory. For example, a counter may be incremented or decremented from a predetermined value after each deletion trial and when the counter reaches a predetermined maximum value or is reset to zero, the deletion of at least one or both keys of the global key pair is performed anyway.

Figure 7:
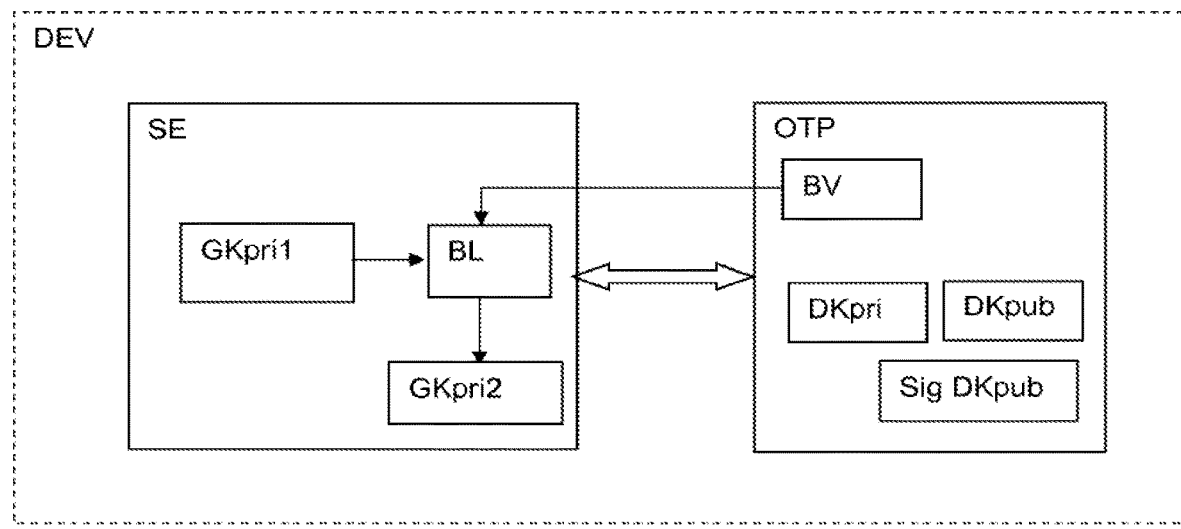
FIG. 7 shows an embodiment of the device where the global private key generated by the secure element is blinded by a blinding value programmed in the one time programmable memory to provide a "real" value of the global private key.

In case a provisioning of the global key pair is not possible at manufacturing or personalization of the device DEV, for example for cost reasons; two optional solutions may be envisaged:

A) The global private key GKpri1 may be hard coded during an initialization phase of the device DEV into the secure element SE and blinded with a global value BV stored in the OTP memory as shown by FIG. 7. The terms "hard coded" mean here that the global private key GKpri1 is built into the hardware and/or software of the secure element SE in such a way that it cannot be modified.

A blinding operation BL may consist of an application, by the processor of the secure element SE, of a predetermined mathematical function or algorithm using the global value BV as parameter on the value of the hard coded global private key GKpri1.

The result thus obtained represents the effective or "real" value GKpri2 of the global private key used by the secure element SE of the device DEV to generate the device key pair (DKpri, DKpub) and calculate the signature Sig DKpub of the device public key DKpub.

Figure 8:
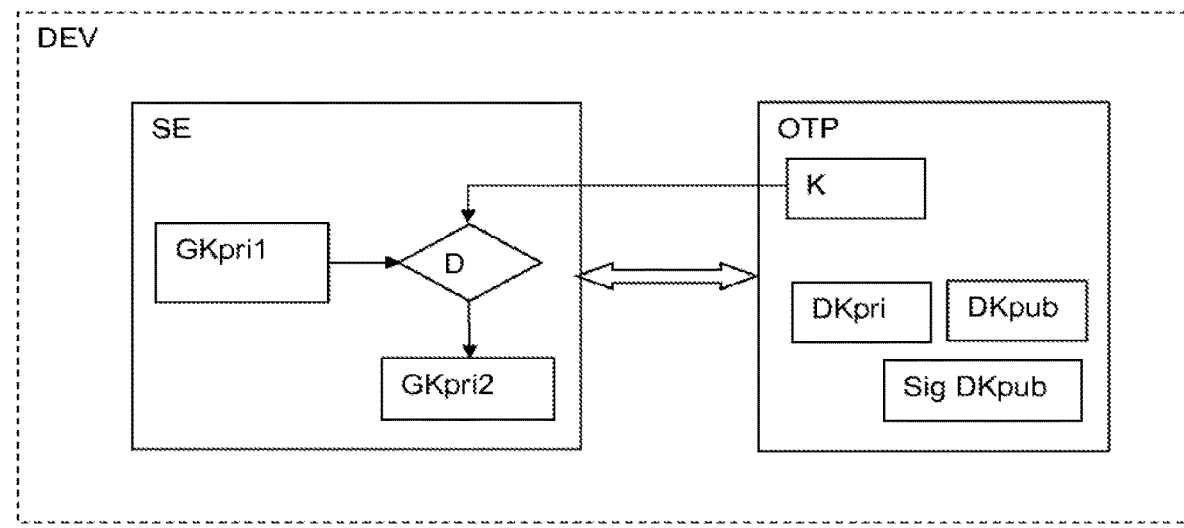
FIG. 8 shows an embodiment of the device where the global private key generated by the secure element is encrypted by a key hard coded in the one time programmable memory to provide a "real" value of the global private key.

B) The global private key GKpri1 may be hard coded into the secure element SE and encrypted with a global value representing a global key K programmed in the OTP memory as shown by FIG. 8. The encryption operation uses preferably a proprietary algorithm instead of a known encryption algorithm such as Encryption Standard (DES) or Advanced Encryption Standard (AES) to produce an effective or "real" value of the global private key GKpri. This "real" value is then used by the secure element SE to calculate the signature Sig DKpub of the device public key DKpub.

In these examples, a modification or deletion of the bit strings corresponding to the blinding value BV or the global key K by programming unlocked bits is sufficient to prevent re-using the global private key GKpri1. Preferably, private key or "real" global private key GKpri2 used depends directly on the blinding value BV or the global key K.

Figure 4:
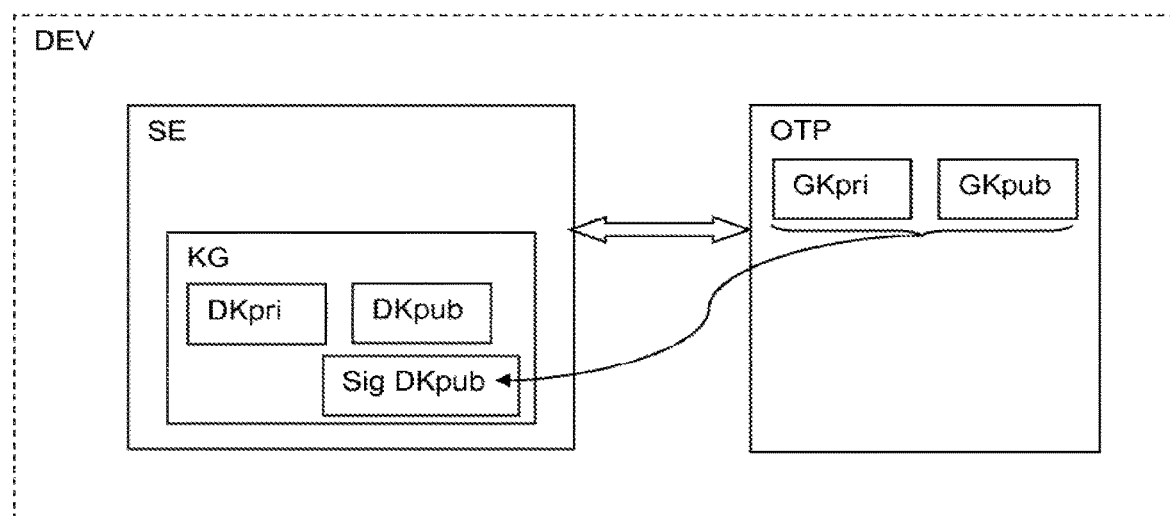
FIG. 4 shows an embodiment of the device where the generated device public key is signed by using the global key pair.

Moreover, in the disclosed embodiments, the signature may be determined in a similar way than in case where the global private key is stored in the OTP memory as shown by FIG. 4.

A hacker may thus not "play with" the global values stored in the OTP memory to perform Differential Power Analysis (DPA) or Simple power analysis (SPA) attacks. Even a decapping attack by dismounting the secure element SE or the OTP memory to observe and analyze hard-coded bit strings structure is prevented because the global value is generally erased after first start or boot of the device.

One additional possibility for a hacker would be to try attacking the device before initialization or boot, when the global value has been previously written into the OTP memory at manufacturing of the device. Such an attack may be overcome in embodiments combinable with the other embodiments disclosed herein by protecting the OTP memory, or the specific area where the global values are stored, by some other security mechanisms such as obfuscation techniques or shielding against decapping attacks.

The invention claimed is:

1. A method to protect a device key in a device, the method comprising:
   storing a global value in a form of a bit string comprising locked bits and unlocked bits,
      the locked bits being irreversibly preprogrammed in at least one one-time-programmable memory locally connected to at least one secure element, and
      the unlocked bits remaining in an initial state to be programmable by the at least one secure element:
   generating, by the at least one secure element, a device-specific value by using the stored global value;
   programming, by the at least one secure element, the generated device-specific value in the at least one one-time-programmable memory; and
   erasing, by the at least one secure element, the stored global value by programming the unlocked bits of the bit string.

2. The method according to claim 1,
   wherein the stored global value comprises an asymmetric global private key pair including a global private key and a global public key, and
   wherein the generated device-specific value comprises an asymmetric device key pair including a device private key and a device public key.

3. The method according to claim 2, further comprising calculating, by the at least one secure element, a signature of the device public key by signing a digest resulting from an application of a hash function on the device public key with the global private key, the global public key being used to verify the calculated signature.

4. The method according to claim 3, wherein the stored global value includes a global key to be used to determine an effective value of a global private key of a unique asymmetric global key pair, the global private key is hard-coded in the at least one secure element during an initialization phase of the device.

5. The method according to claim 4, wherein the at least one secure element encrypts the hard-coded global private key with the global key such that a result obtained represents the effective value of the global private key used by the device for generating a device key pair and to calculate the signature of the device public key.

6. The method according to claim 3,
   wherein the device private key, the device public key, and the signature previously verified are programmed by the at least one secure element in the at least one one-time-programmable memory, and
   wherein the global private key or the asymmetric global private key pair stored in the one-time-programmable memory is erased by programming the unlocked bits of a corresponding bit string.

7. The method according to claim 2, wherein the global private key is hard-coded, during an initialization phase of the device, into the at least one secure element and is blinded with a blinding value stored in the at least one one-time-programmable memory.

8. The method according to claim 7, wherein the at least one secure element applies a blinding operation including a predetermined mathematical function or algorithm using the blinding value as a parameter of a value of the hard-coded global private key, such that a result obtained represents an effective value of the global private key used by the device to generate the asymmetric device key pair and to calculate a signature of the device public key.

9. A device, comprising:
   at least one one-time-programmable memory configured to store a global value in a form of a bit string comprising locked bits and unlocked bits,
      the locked bits being irreversibly pre-programmed in the at least one one-time-programmable memory, and
      the unlocked bits remaining in an initial state to be programmable by a secure element; and
   at least one secure element locally connected to the at least one one-time-programmable memory, and comprising a processor configured to:
      generate a device-specific value by using the global value,
      program the device-specific value in the at least one one-time-programmable memory, and
      erase the global value by programming the unlocked bits of the bit string.

10. The device according to claim 9,
    wherein the global value comprises an asymmetric global private key pair including a global private key and a global public key, and
    wherein the device-specific value comprises an asymmetric device key pair including a device private key and a device public key.

11. The device according to claim 10, wherein the processor is further configured to calculate a signature of the device public key by signing a digest resulting from an application of a hash function on the device public key with the global private key, the calculated signature being verified by the global public key.

12. The device according to claim 11, wherein the processor is further configured to:

program the device private key, the device public key, and the signature previously verified in the at least one one-time-programmable memory, and erase the global private key or the asymmetric global private key pair stored in the at least one one-time-programmable memory by programming the unlocked bits of a corresponding bit string.

13. The device according to claim 10, wherein the global private key is hard-coded, during an initialization phase of the device, into the at least one secure element and is blinded with a blinding value stored in the at least one-time-programmable memory.

14. The device according to claim 13, wherein the processor is further configured to:

apply a blinding operation including a predetermined mathematical function or algorithm using the blinding value as a parameter of a value of the hard-coded global private key, and use a result obtained, representing an effective value of the global private key, for generating the asymmetric device key pair.

15. The device according to claim 9, wherein the global value includes a global key, the processor being further configured to use the global key for determining an effective value of a global private key of a unique asymmetric global key pair, the global private key is hard-coded in the at least one secure element during an initialization phase of the device, the at least one secure element being further configured to encrypt the hard-coded global private key with the global key, such that a result obtained represents the effective value of the global private key.

\* \* \* \* \*